United States Patent Office 2,747,648
Patented May 29, 1956

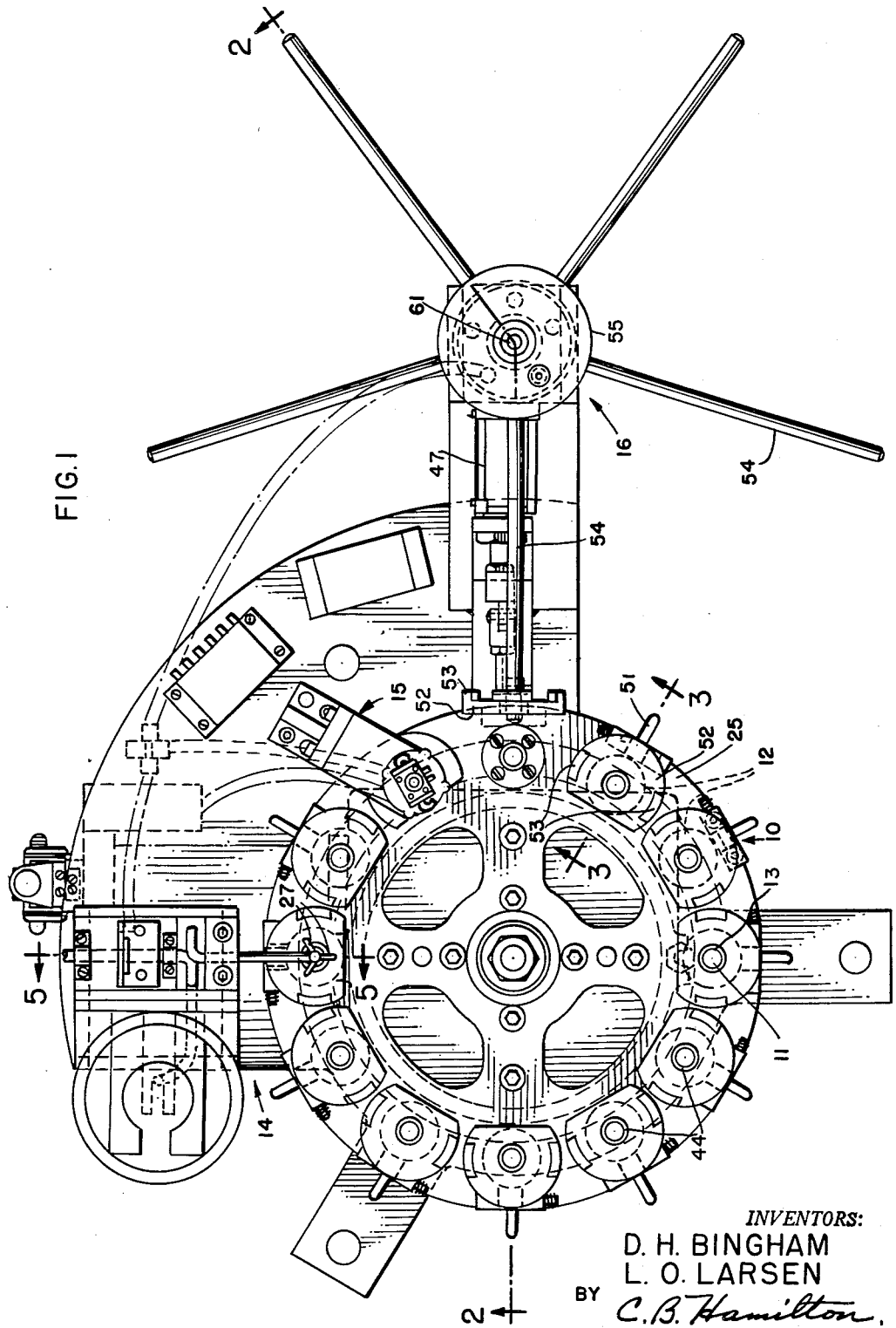

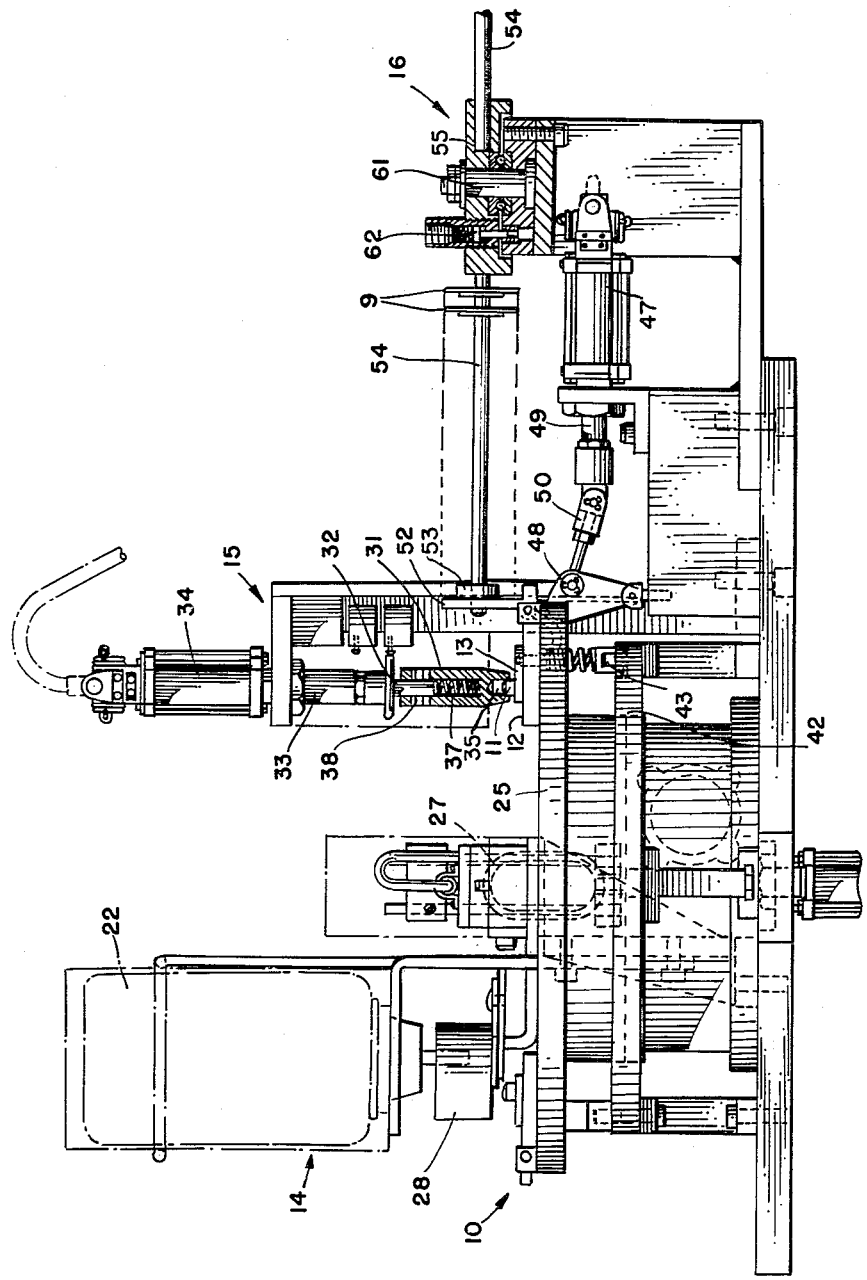

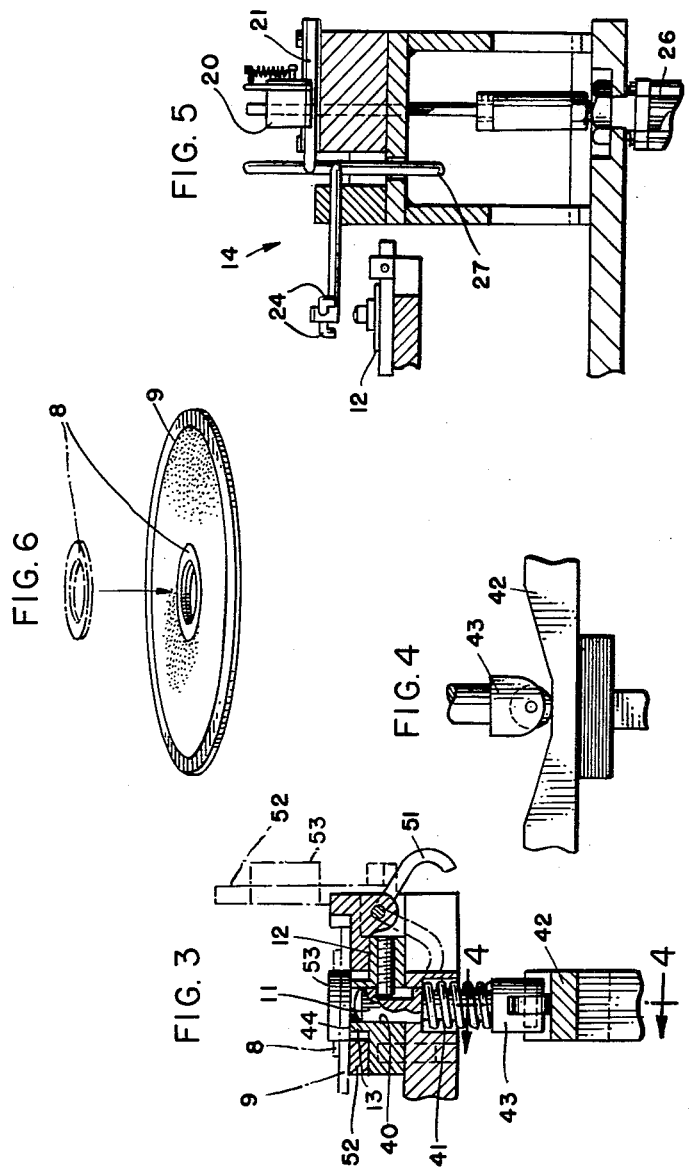

2,747,648

APPARATUS FOR UNITING PLASTIC WASHERS WITH ANNULAR PLASTIC PADS

Darwin H. Bingham and Leonard O. Larsen, Indianapolis, Ind., assignors to Western Electric Company, Incorporated, New York, N. Y., a corporation of New York Application September 28, 1953, Serial No. 382,716

7 Claims. (Cl. 154—1.5)

This invention relates to apparatus for assembling articles, and more particularly to apparatus for gluing or uniting washers to annular pads.

An object of the invention is to provide new and improved apparatus for assembling articles.

Another object of the invention is to provide apparatus for gluing washers to annular pads.

A further object of the invention is to provide apparatus for sequentially applying a solvent such as acetone to a plastic washer and an annular pad, pressing the washer and the pad together and stacking the resulting article. The washer may be composed of a plastic softenable in acetone, and the pad may be composed of plastic or the like. Suitable plastics for the washer and pad are cellulose acetate and cellulose acetate-butyrate.

In an apparatus illustrating certain features of the invention, a washer and an annular pad are placed on a holder, and are moved sequentially past an adhesive-applier, a presser and a spoked stacker, the washer and the pad being glued together by the adhesive-applier and the presser. The holder is swung over a spoke of the stacker as it arrives at the stacker to deposit the finished article thereon.

A complete understanding of the invention may be obtained from the following detailed description of an apparatus forming a specific embodiment thereof, when read in conjunction with the appended drawings, in which Fig. 1 is a top plan view of an apparatus forming one embodiment of the invention;

Fig. 2 is a front elevation of the apparatus shown in Fig. 1;

Fig. 3 is a vertical section taken along the line 3—3 of Fig. 1;

Fig. 4 is a vertical view taken along the line 4—4 of Fig. 3;

Fig. 5 is a fragmentary, vertical section taken along line 5—5 of Fig. 1, and

Fig. 6 is an exploded view of an article processed by the apparatus shown in Fig. 1.

Referring now in detail to the drawings, there is shown therein an apparatus for cementing a washer 8 to a pad 9, which is an ear pad or cushion for a telephone operator's headset, and stacking the resulting reinforced pad or washer-like article. This apparatus includes a turret 10 rotatable step-by-step, which moves acetone-softenable pads placed manually on pins or posts 11 slidable in annular holders 12 having annular bosses 13. The pins 11 project through acetone-softenable washers also positioned on the holders and the holders carry the washers to an acetone applicator 14 and a presser 15, and then moves the resulting composite pad to a rack 16 in which the pads are discharged. The annular pads and their washers are placed manually on the holders 12, which are pivotally mounted on the turret 10, and, as the articles are moved under the applicator 14, a presser 20 is moved down onto a compressible hose 21 leading from a constant level reservoir 22 to compress the portion of the hose 21 thereunder to force a given quantity of acetone from a divided spout or spouts 24 positioned over the washer and the pad.

The turret includes a dial 25 driven step-by-step automatically by a well known type of drive (not shown) in a clockwise direction, as viewed in Fig. 1, and each time one of the holders is positioned under the spouts 24, a suitable dog (not shown) carried by the dial actuates a pneumatic cylinder 26 to reciprocate the presser 20 down and up to press a measured quantity of acetone from the spouts through a U-tube or trap 27 connecting the spouts to the hose 21, the other end of which is connected to a pan 28. The reservoir 22 keeps the acetone in the pan 28 at a level just below the spouts. The acetone dissolves the washer and pad sufficiently so that they will stick together when pressed together, and the presser 15 presses them together as they are positioned thereunder. The holder 12 at the applicator 14 is moved therefrom to the presser 15 with the pad 9 and the washer 8, and is stopped by the dial 25 directly beneath a pressing sleeve 31 having a socket 35 therein mounted slidably on a piston rod 32 carried by a piston 33 actuatable by a pneumatic cylinder 34. The sleeve 31 may be heated if desired. As the dial arrives at this position, a dog (not shown) carried thereby actuates the cylinder 34 to reciprocate the piston rod 32. As the piston rod 32 is moved downwardly, it moves the pressing sleeve 31 over the pin 11 and presses the washer tightly against the pad to bond them securely together through the force of a spring 37 urging the sleeve downwardly on the rod, a pin-and-slot connection 38 limiting downward travel of the sleeve on the rod.

Up to this time, the pin 11 is projected up through a central bore 40 in the holder 12 (Fig. 3) against the action of a spring 41 by a cam track 42 and a cam follower 43. The bore 40 is formed in an annular boss 44 of the holder 12. Then, as the dial again is indexed, the spring 41 lowers the pin 11 as the holder 12 arrives at and is stopped at the rack 16. A dog (not shown) on the dial then actuates a pneumatic cylinder 47 to oscillate once a cam 48 (Fig. 2) through a piston rod 49 and a linkage 50. The cam strikes a cam follower 51 fastened rigidly to a counterweighted annular transfer plate 52 having arcuate lugs 53 thereon, and the follower swings the transfer plate to its broken-line position shown in Fig. 3 to swing the pad onto a rod or spoke 54 secured to a hub 55. This places the annular article on the spoke, and the plate 52 falls back into place in preparation to receive another pad and washer. The dial then indexes again and the pin 11 is projected up through the holder 12 again to receive another pad and washer. The rack 16 is mounted rotatably on a rod 61, and is indexed manually to present empty spokes or rods 54 at the racking station. A manually operable latch 62 may be actuated to release the rack for indexing purposes.

The above-described apparatus serves to rapidly and uniformly secure washers to pads, and is simple and inexpensive in both construction and operation.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An apparatus for uniting plastic washers to annular plastic pads, which comprises a turret movable step-by-step past a plurality of stations, a plurality of annular holders having annular bosses on the turret for carrying annular pads and washers in proximity, a plurality of annular transfer plates fitting over the bosses and pivotal relative to the holders, a dispenser provided with a spout and a trap at one of said stations, means for forcing an appropriate solvent through the trap and the spout in measured quantities onto a washer and a pad supported by one of the holders at that station, a plurality of pins projectable through the bosses, means for projecting the pins through the bosses to locate the washers and pads on the bosses, a presser having a socket designed to fit over the pins to press the washers against the pads, means for actuating the presser, a hub having a plurality of spokes mounted rotatably for moving the spokes one after another to a position projecting to the turret at one of said stations, and pneumatic means for swinging each plate onto the spoke in said position to deposit the washer and pad on the spoke.

2. An apparatus for assembling articles, which comprises a holder for supporting an annular plastic article thereon, a transfer plate, a carrier supporting the holder and also supporting the transfer plate pivotally thereon for moving the holder and the plate along a given path, a dispenser positioned at one point along said path for applying an appropriate solvent to said article to soften the same carried therepast by the holder, a rod extending laterally from the path at a third point therealong and means for swinging the transfer plate over the rod to deposit articles carried thereby on the rod.

3. An apparatus for assembling articles, which comprises an annular holder for supporting an annular plastic article thereon, a transfer plate, a carrier supporting the holder and also supporting the transfer plate pivotally thereon for moving the holder and the plate along a given path, a dispenser positioned at one point along said path for applying a solvent for softening said article to said article carried therepast by the holder, a presser located at a subsequent point along said path for coacting with the holder to press two annular articles on the holder tightly together, a rod extending laterally from the path at a third point in the path, and means for swinging the transfer plate over the rod to deposit articles carried by the holder on the rod.

4. An apparatus for uniting plastic washers with annular plastic pads which have been softened by a suitable solvent, which comprises a turret movable step-by-step past a plurality of stations, a plurality of holders having annular bosses mounted on the turret for carrying annular pads and washers in proximity, a plurality of annular transfer plates fitting over the bosses and pivotal relative to the holders, a plurality of pins projectable through the bosses, means for projecting the pins through the bosses to locate the washers and pads on the bosses, a presser having a socket designed to fit over the pins to press the washers and the pads against the bosses, means for actuating the presser, and means for swinging each plate away from the holder to remove an annular pad and washer therefrom.

5. An apparatus for uniting plastic washers with annular plastic pads which have been softened by a suitable solvent, which comprises a turret movable step-by-step past a plurality of stations, a plurality of holders having annular bosses mounted on the turret for carrying annular pads and washers in proximity, a plurality of counterweighted annular transfer plates fitting over the bosses and pivotal relative to the holder, a plurality of pins projectable through the bosses, means for projecting the pins through the bosses to locate the washers and pads on the bosses, a hub having a plurality of spokes mounted rotatably for moving the spokes one after another to a position projecting to the turret at one of said stations, and means for swinging each plate onto the spoke in said position to deposit the washer and pad onto the spoke.

6. An article-handling device, which comprises an annular holder having a boss, a pin mounted slidably in the boss, means for moving the holder, means for moving the pin between an operative position extending beyond the boss to hold an annular article on the boss and a retracted position, a transfer plate designed to fit over the boss, and means for swinging the transfer plate away from the boss to remove an annular article from the boss.

7. An article-handling device, which comprises an annular holder having a boss, a pin mounted slidably in the boss, means for moving the holder along a given path, cam means extending along the path for moving the pin between an operative position extending beyond the boss to hold an annular article on the boss and a retracted position, an annular transfer plate designed to fit over the boss, and means for swinging the transfer plate away from the boss to remove an annular article from the boss.

References Cited in the file of this patent

UNITED STATES PATENTS

| | | |
|---|---|---|
| 1,735,609 | Frederick | Nov. 12, 1929 |
| 1,941,106 | Park, Jr. | Dec. 26, 1933 |
| 2,405,074 | Underwood | July 30, 1946 |
| 2,641,297 | Wilckens et al. | June 9, 1953 |
| 2,698,644 | Hauk | Jan. 4, 1955 |